(12) United States Patent
Kishimoto

(10) Patent No.: US 8,045,262 B2
(45) Date of Patent: Oct. 25, 2011

(54) LASER SCANNING MICROSCOPE

(75) Inventor: Hiroshi Kishimoto, Yokohama (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 12/814,096

(22) Filed: Jun. 11, 2010

(65) Prior Publication Data

US 2010/0245993 A1  Sep. 30, 2010

Related U.S. Application Data

(63) Continuation of application No. PCT/JP2008/072610, filed on Dec. 12, 2008.

(30) Foreign Application Priority Data

Dec. 13, 2007 (JP) ................................. 2007-322063

(51) Int. Cl.
*G02B 21/00* (2006.01)
(52) U.S. Cl. ....................................... 359/368; 359/363
(58) Field of Classification Search .................. 359/368, 359/363
See application file for complete search history.

(56) References Cited

U.S. PATENT DOCUMENTS

2008/0007820 A1* 1/2008 Moehler et al. ............... 359/363

FOREIGN PATENT DOCUMENTS

JP 2004-212807 A 7/2004

OTHER PUBLICATIONS

International Search Report for International Application No. PCT/JP2008/072610 mailed on Mar. 17, 2009, 2 pages.

* cited by examiner

*Primary Examiner* — Joshua L Pritchett
(74) *Attorney, Agent, or Firm* — Osha • Liang LLP

(57) ABSTRACT

The present invention relates to a laser scanning microscope that can generate an arbitrary control signal without depending on the configuration of the hardware. A memory 64 has a bit width wider than a bit width of drive data based on a drive table for generating a drive signal X for driving a scanner, which is driven by a drive circuit 66X, to scan a designated scanning area at a designated speed, and stores the drive table, and a controller 61 sets a control signal for controlling a predetermined operation in a predetermined mechanism that has a strict time relationship with the scanning based on the drive data, in bits in the bit width of the memory 64X, excluding the bits used by the drive data, and these mechanisms perform the predetermined operation based on the control signal that is read simultaneously when the drive data is read from the memory 64X. The present invention can be applied to a confocal laser scanning microscope that observes a sample by performing scanning with laser light.

4 Claims, 5 Drawing Sheets

LASER SCANNING MICROSCOPE

TECHNICAL FIELD

The present invention relates to a laser scanning microscope, and more particularly to a laser scanning microscope that can observe a sample by performing scanning with laser light with a simplified hardware configuration.

BACKGROUND ART

In conventional laser scanning microscopes, a reflecting element, such as a galvano scanner, is disposed on an optical path between a laser light resource and an objective lens, and the sample is scanned by the laser light by changing the rotation angle of this reflecting element continuously (e.g. see Patent Document 1).

In the case of a laser scanning microscope, reading the scan data on scanning systems and control signals, for performing image capture control and laser control, are normally constructed as independent systems synchronizing with a common reference clock. In Patent Document 1, for example, the scanner control circuit and the image sampling circuit are constructed as independent systems that synchronize with the reference clock from the clock generation circuit.

[Patent Document 1] Japanese Patent Application Laid-Open No. 2004-212807

However in the case of prior art including Patent Document 1, laser lighting control and image capturing control are implemented by hardware, so supporting complicated combinations of control signals to perform these controls is difficult.

According to the conventional hardware-based systems that are used, it is easy to create one set of control signals for one cycle of scanning, but to create a plurality of sets of control signals complicates the circuit configuration since different hardware must be provided for each set. Also a new mechanism to change the predetermined timing on the hardware must be installed to adjust these control signals, which makes the circuit configuration even more complicated.

The circuit configuration cannot be changed after the circuit is designed, which means that an arbitrary control signal cannot be generated once design is completed.

DISCLOSURE OF THE INVENTION

With the foregoing in view, it is an object of the present invention to generate an arbitrary control signal regardless the configuration of the hardware.

A laser scanning microscope of the present invention is a laser scanning microscope having a scanning mechanism for performing scanning on a sample with laser light emitted from a light source, comprising: storage means that has a bit width wider than a bit width of the drive data for driving the scanning mechanism, and stores the drive data; and setting means for setting a control signal for controlling a predetermined operation in a predetermined mechanism that has a strict time relationship with the scanning based on the drive data, in bits in the bit width of the storage means, excluding the bits used by the drive data, and the predetermined mechanism performs the predetermined operation based on the control signal that is read simultaneously when the drive data is read from the storage means.

According to the present invention, an arbitrary control signal can be generated regardless the configuration of the hardware.

Figure 1:
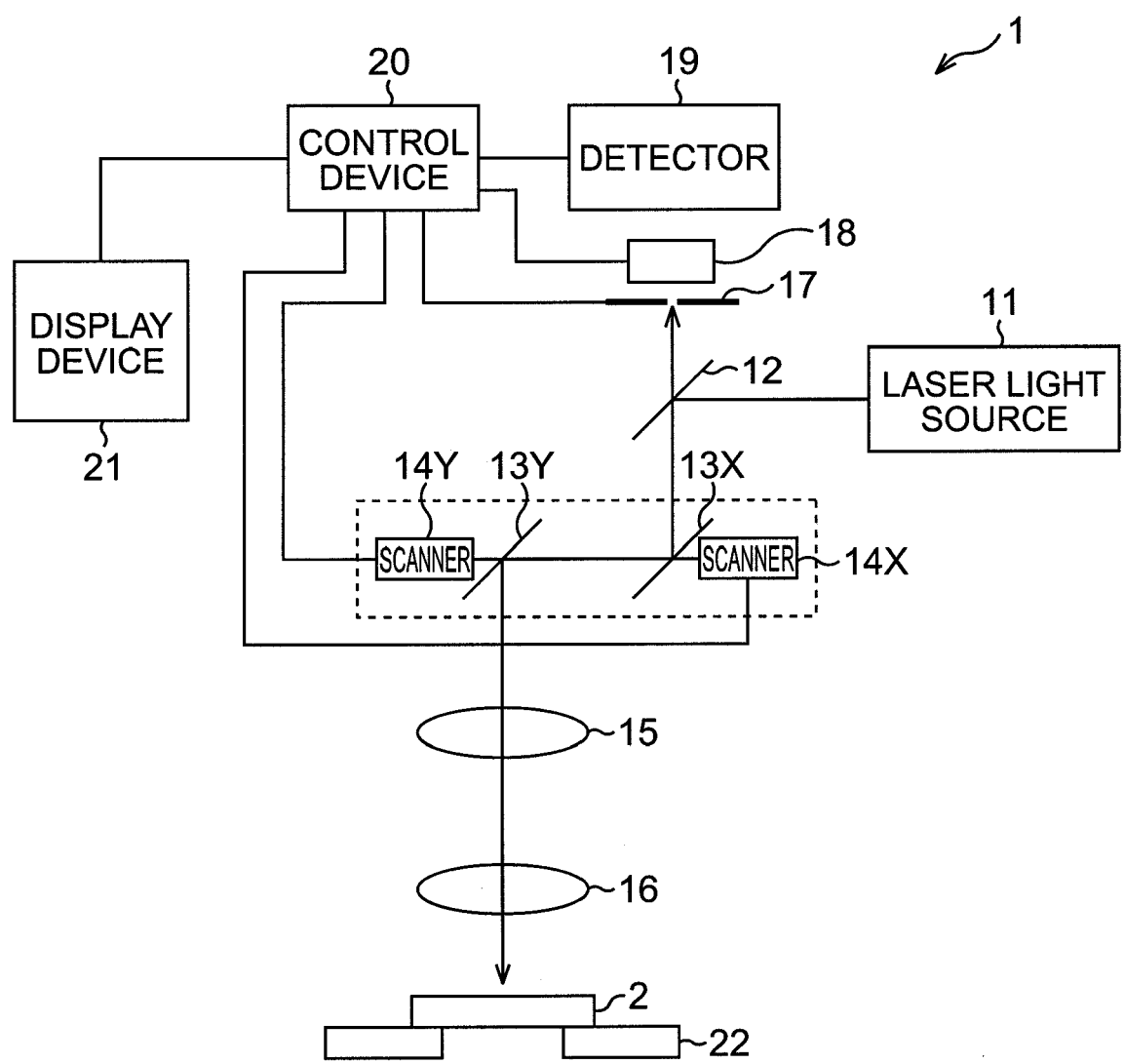
FIG. 1 is a diagram depicting an embodiment of the optical system of a confocal laser scanning microscope to which the present invention is applied.

EXPLANATION OF REFERENCE NUMERALS 1 confocal laser scanning microscope
11 laser light source
12 dichroic mirror
13x and 13Y mirror
14X and 14Y scanner
15 scanning lens system
16 objective lens
17 pin hole
18 fluorescent filter
19 detector
20 control device
21 display device
22 stage
51 scanner drive system
61 controller
62 reference clock generator
63X and 63Y address generator
64X and 64Y memory
65X and 65Y D/A converter
66X and 66Y drive circuit

BEST MODE FOR CARRYING OUT THE INVENTION

Embodiments of the present invention will now be described with reference to the drawings.

FIG. 1 is a diagram depicting an embodiment of an optical system of a confocal laser scanning microscope 1 to which the present invention is applied. The operation of the optical system of the confocal laser scanning microscope 1 will be described.

The laser light (excited light) emitted from the laser light source 11 is guided to a scanner optical system via an optical fiber (not illustrated) of which output end is connected to the fiber connector (not illustrated). The laser light guided into the scanner optical system is reflected in a direction to a mirror 13X by a dichroic mirror 12. The laser light reflected in a direction to the mirror 13X is reflected in a direction to a scanning lens system 15 by the mirror 13X and the mirror 13Y. The laser light is condensed by being transmitted through the scanning lens system 15 and the objective lens 16, and is irradiated onto a sample 2 on a stage 22.

A control device 20 drives a scanner 14X, scans the laser light irradiated onto the sample 2 in the left and right directions (x axis direction) of the confocal laser scanning microscope 1 by controlling the angle of the mirror 13X, drives a scanner 14Y, and scans the laser light irradiated onto the sample 2 in the depth direction (y axis direction) of the confocal laser scanning microscope 1 by controlling the angle of the mirror 13Y.

The fluorescent light, which is excited by irradiation of the laser light and emitted from the sample 2, transmits through the objective lens 16 and the scanning lens system 15, descanned by the mirror 13Y and the mirror 13X, and transmits through the dichroic mirror 12. Then only fluorescent light emitted from the focal plane of the objective lens 16, out of the descanned fluorescent light, transmits through a pin hole 17, then predetermined wavelength components are filtered through the fluorescent filter 18, and converted into electric signals by a detector 19 constituted by PMT (PhotoMulTi-plier), for example. The electric signals are supplied to the control device 20, converted into image data by the control device 20, and supplied to a display device 21. The display device 21 displays an image based on the image data, that is the image of the sample 2.

The control device 20 also controls the pin hole diameter of the pin hole 17 and controls the switching of the fluorescent filter 18.

Figure 2:
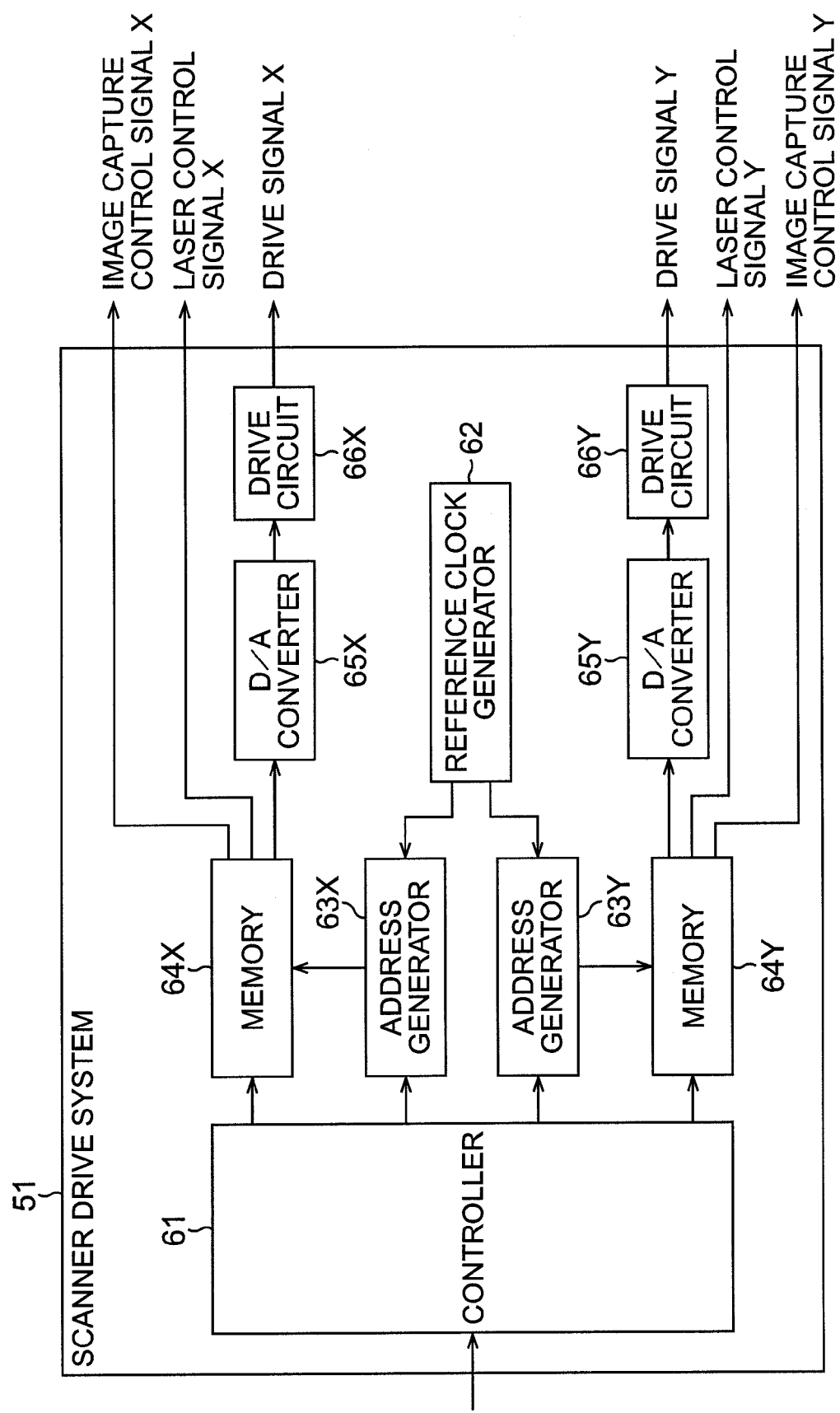
FIG. 2 is a block diagram depicting an example of a configuration of the scanner drive system.

FIG. 2 is a block diagram depicting an example of a configuration of the scanner drive system 51 which drives the mirror 13X and the mirror 13Y, and controls the scanning with the laser light via the scanner 14X and the scanner 14Y out of the elements constituting the control device 20 of the confocal laser scanning microscope 1.

A controller 61 is constituted by such a processor as a CPU (Central Processing Unit), and controls operation of the scanner drive system 51 in general. The controller 61 also obtains information on the operation state of each component of the confocal laser scanning microscope 1 based on the information from other elements constituting the control device 20.

The controller 61 creates drive tables used for generating drive signals X and Y for driving the scanner 14X and the scanner 14Y so that a designated scanning area is scanned at a designated speed, and stores them in the memory 64X and memory 64Y respectively. In other words, there are two types of drive tables: one for the drive circuit 66X (for the x axis) for driving the scanner 14X, and one for the drive circuit 66Y (for y axis) for driving the scanner 14Y, and data corresponding to the voltage values of the drive signal X, that is output from the drive circuit 66X, or the drive signal Y, that is output from the drive circuit 66Y, is arranged in a time series. In other words, the drive table shows time series data for driving the scanner 14X or scanner 14Y.

The controller 61 also controls the address generator 63X and address generator 63Y so that a designated scanning area is scanned at a designated speed based on the drive table for the x axis stored in the memory 64X and the drive table for the y axis stored in the memory 64Y.

The clock signals generated by a reference clock generator 62 are supplied to the address generator 63X and the address generator 63Y. Although not shown, the clock signal is supplied to the address generator 63X and address generator 63Y in a state of being converted into a predetermined frequency by a divider for converting the clock signal from the reference clock generator 62.

The address generator 63X supplies an address signal to instruct an address, from which data is read, to the memory 64X synchronizing with the clock signal from the reference clock generator 62 based on the control by the controller 61. The memory 64X outputs the data being set in the drive table sequentially to the D/A (Digital/Analog) converter 65X based on the address signal, the D/A converter 65X converts this data into an analog signal, and supplies it to the drive circuit 66X. The drive circuit 66X supplies a drive signal X of the voltage corresponding to the data read from the drive table to the scanner 14X based on the analog signal from the D/A converter 65X, and controls the angle of the mirror 13X.

In the same manner, the address generator 63Y supplies an address signal to instruct an address, from which the data is read, to the memory 64Y synchronizing the clock signal from the reference clock generator 62 based on the control by the controller 61. The memory 64Y outputs the data being set in the drive table sequentially to a D/A converter 65Y based on the address signal, and the D/A converter 65Y converts this data into an analog signal, and supplies it to the drive circuit 66Y. The drive circuit 66Y supplies a drive signal Y of the voltage corresponding to the data read from the drive table to the scanner 14Y based on the analog signal from the D/A converter 65Y, and controls the angle of the mirror 13Y.

In the memory 64X, the drive table for the x axis is stored, and the data range of the drive table, which stores the drive data as input data to the D/A converter 65X, is limited to the input range of the D/A converter 65X. In the case of a 12-bit D/A converter, for example, the numerical value range that can be handled there is limited to the 0 to 8191 range.

Figure 3:
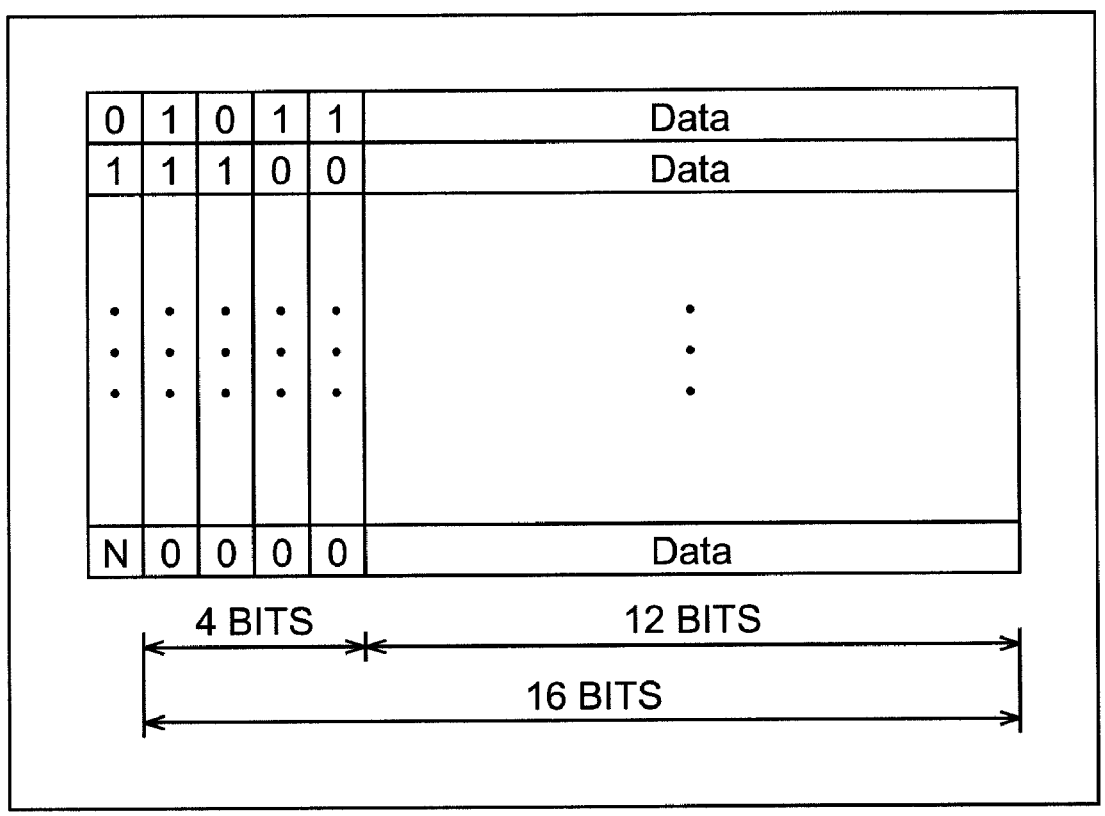
FIG. 3 is a diagram depicting an example of a memory for storing control data and drive data.

Therefore if the memory 64X having a 16-bit width is used for the drive table for the x axis, for example, then an unnecessary 4 bits (16−12=4 bits) can be assigned to different data. In other words, the memory 64X having a 16-bit width can store data that is different from the drive data in the first 4 bits, and can store the drive data ("Data" in the case of the example in FIG. 3) in the subsequent 12 bits, as shown in FIG. 3. The data different from the drive data referred to here is, for example, such a control signal as an image capture control signal X and laser control signal X, that is, control data having a strict time relationship with the scanning based on the drive data. Hence a control signal synchronizing with the drive output can be generated without using a special synchronization signal, by separately reading these control signals by a predetermined circuit as soon as drive data is read.

In FIG. 3 for example, if control signals "1", "0", "1" and "1" and the drive data "Data" are stored in the memory 64X, the scanning area designated based on "Data" is scanned at the designated speed, and an image can be obtained by scanning using such control signals (e.g. "1", "0", "1", "1" in FIG. 3) as the image capture control signal X and laser control signal X, which are read simultaneously with the above mentioned scanning.

Figure 4:
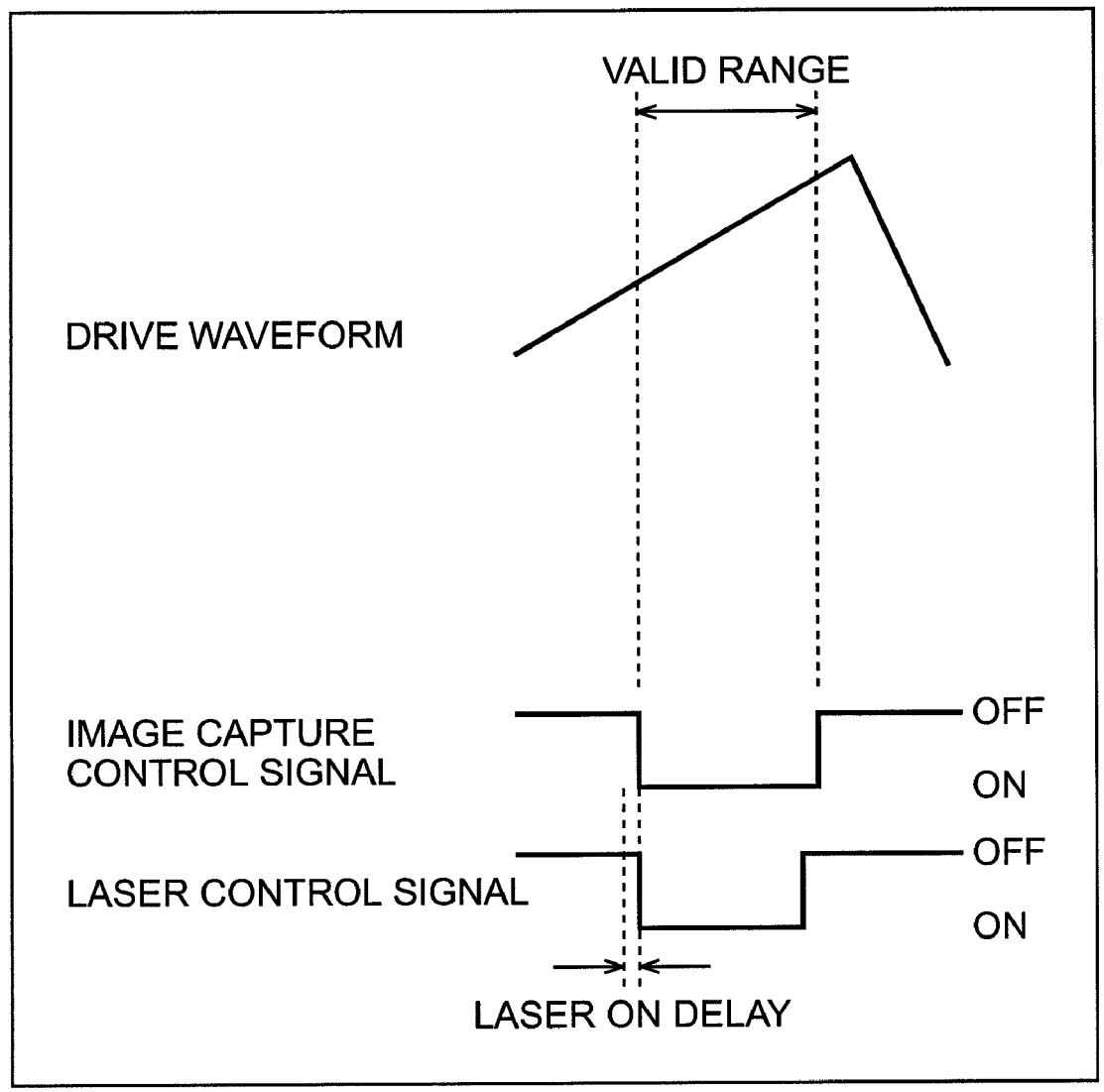
FIG. 4 is a timing chart depicting the relationship of the scanning system and detection system.

In other words, in the case of obtaining an image by scanning, the timing to obtain the image must be started at a predetermined timing with respect to the drive signal X, and is controlled by the image capture control signal X. In FIG. 4, for example, the top portion shows a drive waveform based on the drive table, and of this drive waveform, the range indicated by "valid range" is the range of capturing the image, therefore as the mid- and bottom portions show, the image capture control signal X is ON in this valid range, and is OFF in the other range.

Before obtaining an image like this, the laser light must be lit, but a predetermined time is normally required for lighting the laser light, so it is necessary to generate a laser control signal X which turns ON sooner than the image capture control signal X for the amount of delay of lighting of the laser light. Therefore in FIG. 4, the laser control signal X turns ON sooner than the image capture control signal X for the amount of "laser ON delay" in the valid range.

In other words, when the image is obtained by scanning, the controller 61 sets a control signal, "0" or "1", in bits in the bit width of the memory 64X, excluding the bits used by the drive table, in order to switch ON/Off of the control signal, such as image capture control signal X and laser control signal X. Thereby the laser mechanism to control lighting of the laser turns the laser light ON before the image capture mechanism starts obtaining the image based on the laser control signal X, and the image capture mechanism starts obtaining the image by scanning as soon as the laser light turns ON, based on the image capture control signal X. The controller 61 has obtained information on the operation state of each portion of the confocal laser scanning microscope 1 in advance, and sets the control signal in the memory 64X based on this information.

More specifically, in FIG. 3, if it is assumed that the control signal that is set in the first bit of the memory 64X is the laser control signal X and the control signal that is set in the second bit is the image capture control signal X (other control signals are also set in the third and fourth bits, but description thereof is omitted to simplify explanation), then the laser control signal X is "1" and the image capture control signal X is "0", since "1", "0", "1" and "1" are set in the memory 64X at the beginning. In other words, the laser control signal X is ON, so the laser mechanism turns the laser light ON. The image capture control signal X is OFF, on the other hand, so the image capture mechanism does not start obtaining the image at this point.

Then "1", "1", "0" and "0" are set in the memory 64X, so the laser control signal X is still "1" and the image capture control signal X is changed to "1". In other words, the image capture control signal X turns ON along with the laser control signal X, so the image capture mechanism starts obtaining images by scanning simultaneously with lighting the laser light.

Then in the memory 64X, the control signals which became "0" or "1" according to ON/OFF of the control signal, such as the laser control signal X and image capture control signal X, and drive data, are sequentially stored. After these control signals and drive data are sequentially stored, the control signals "0", "0", "0" and "0" and drive data "Data", for example, are finally stored as shown in FIG. 3. Thereby the image capture mechanism obtains images by scanning.

Since the four bits which are output as control signals, such as image capture control signal X and laser control signal X, are a part of normal memory, an arbitrary position of the drive table storing the drive data can be turned ON/OFF. For example, in the case of the example in FIG. 3, the control signals are set in the upper 4 bits, but the control signals can be set in any bits excluding the bits used for the drive table, such as set in the lower 4 bits, or set in the upper 2 bits and lower 2 bits. In other words, an extremely complicated combination of control signals for drive signals can be set as a simple data in memory, since the drive data and control signals are integrated and set in a same memory, and any relationship of the drive signals and control signals can be created regardless the hardware configuration, since the drive signals and control signals are handled as simple data.

Figure 5:
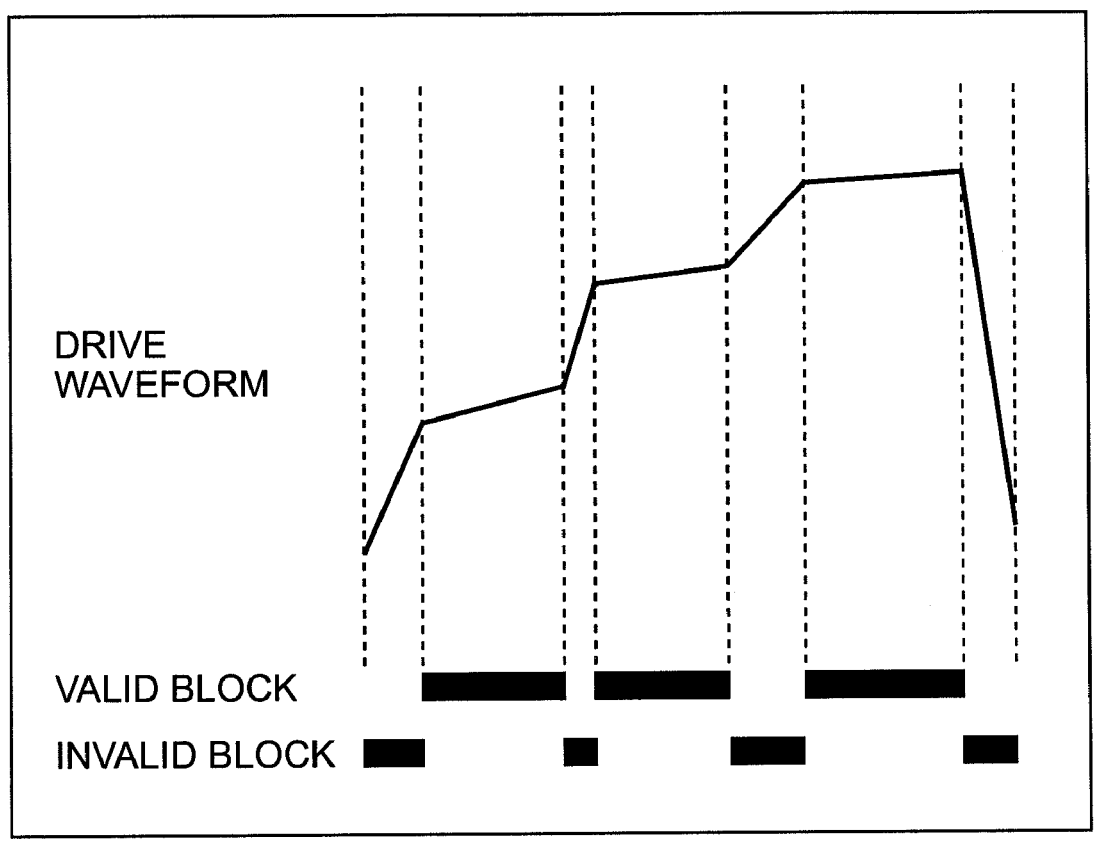
FIG. 5 is a diagram depicting a drive example when a complicated control is required.

Concerning the relationship of the drive signals and control signals, a valid block for obtaining images and an invalid block may repeatedly appear irregularly, as shown in the lower portion of FIG. 5, when the drive waveform is as shown in the upper portion of FIG. 5. In this case, a control signal for controlling the obtaining of an image in the valid block and invalid block must be generated, but since the appearance patterns of the valid block and invalid block are irregular, the complicated timing of control signals must be generated. According to the present embodiment, the relationship of the drive signals and control signals can be freely generated by handling the control signal as simple data in the memory, so the complicated timing of control signals, as shown in FIG. 5 for example, can also be generated. Even after designing circuits, an arbitrary control signal can be generated simply by changing the data that is set in the memory.

As mentioned above, if control signals, with complicated timing control signals as in FIG. 5, are generated using a conventional configuration that does not handle control signals as data in the memory, the hardware configuration becomes complicated since control signals must be generated by a separate circuit that is hardware based.

In the memory 64Y, on the other hand, the drive table for the y axis is stored, and the memory 64Y has a bit width that is wider than the bit width of the drive data, just like the memory 64X, and the control signals are stored in the bits excluding the bits used for the drive data. In other words, any relationship of the drive signals and control signals can be created regardless the hardware configuration, since the drive signals Y and the control signals, such as the image capture control signal Y and laser control signal Y, are handled as simple data in the memory.

In the present embodiment, the memory 64X for storing the drive table for the x axis and the memory 64Y for storing the drive table for the y axis were separately described to simplify description, but these memories may be integrated into one memory, and in this case, the drive table for the x axis and the drive table for the y axis are stored in the same memory, but it is still the same in that the drive data and control signals are stored, as mentioned above. The bit widths of the memory 64X and the memory 64Y are not limited to 16 bits, but may be a bit width wider than the bit width of the drive data, such as 24 bits. For example, if 12 bits of drive data are stored in the memory 64X having a 24 bits of bit width, then 12 bits, after removing the bits used for this drive data, are provided for the control signals.

The control signal may be set in both the memory 64X and the memory 64Y, or may be set in one of the memory 64X and the memory 64Y. For example, if an image capture control signal corresponds to one control signal, the image capture control signal X can be set only in the memory 64X. In the present embodiment, the capture control signal and laser control signal were described as examples of control signals, but other control signals can be used with certainty, as long as they are control signals for controlling the predetermined operation in a predetermined mechanism, which has a strict time relationship with the scanning based on the drive data, such as a control signal to indicate the start or end of the X line, or a control signal to indicate the start or end of the Y line.

The controller 61 may change the content of the drive table for the x axis that is stored in the memory 64X, and the content of the drive table for the y axis that is stored in the memory 64Y, into an appropriate content according to the frame rate, for example. In other words, the drive table is a table in which data corresponding to the voltage values of the drive signals X that are output from the drive circuit 66X or the voltage values of the drive signals Y that are output from the drive circuit 66Y, is arranged in a time series, and the controller 61 can create a drive table having an arbitrary size when a predetermined timing occurs, and stores it in the memory 64X or memory 64Y. In this case, the content of "Data" in FIG. 3 is overwritten. On the other hand, the drive table can also be fixed, and in this case, the content of "Data" in FIG. 3 is fixed.

As described above, in the confocal laser scanning microscope 1, the input data bit width of the D/A converter 65X or D/A converter 65Y is fixed, so if the bit width of the memory 64X or memory 64Y, constituting the drive table is constructed to be a bit width wider than the above input data bit width, then the bits which are not used for the drive table can be directly output and used as control signals. In this case, the timing of reading the drive table and the timing of control signals to be read are strictly matched, so the timing to turn the control signals ON/OFF is set in an arbitrary position in the drive table for an arbitrary number of times. In other words, the time relationship of the drive data and control signals can be set as simple data, therefore flexibility in setting the control signals is high, and even a complicated combination of control signals can be easily generated.

By setting the control data corresponding to control signals in predetermined bits in the memory for storing the drive data, an independent control signal generation mechanism can be omitted, hence the circuit configuration can be simplified. Further, data corresponding to control signals is set in the memory, therefore the timing of control signals can be easily changed without changing the hardware.

Since the drive signals and control signals are simultaneously read as data in the memory, synchronization signals are not required, and as a result, a mechanism to make the timings variable for adjusting the control signals is unnecessary in hardware, which further simplifies the circuit configuration.

The embodiments of the present invention are not limited to the above described embodiment, but numerous modifications can be made without departing from the spirit and scope of the invention.

The invention claimed is:

1. A laser scanning microscope having a scanning mechanism for performing scanning on a sample with laser light emitted from a light source, comprising:
   a memory that has a bit width wider than a bit width of drive data for driving the scanning mechanism and stores the time series drive data in a direction perpendicular to the bit width of the memory; and
   a controller applied to set a control signal in chronological order for controlling a predetermined operation in a predetermined mechanism that has a strict time relationship with the scanning based on the drive data, in bits in the bit width of the memory, excluding the bits used by the drive data, such that the drive data is synchronized with the direction perpendicular to the bit width,
   wherein the predetermined mechanism performs the predetermined operation based on the control signal that is read sequentially in the direction perpendicular to the bit width of the memory simultaneously when the drive data is read from the memory.

2. The laser scanning microscope according to claim 1, wherein the drive data is a table in which data corresponding to voltage values for driving the scanning mechanism is arranged in a time series, and
   the controller overwrites the content of the table at a predetermined timing.

3. The laser scanning microscope according to claim 1, wherein the drive data is a table in which data corresponding to voltage values for driving the scanning mechanism is arranged in a time series, and
   the memory stores the content of the table as read only.

4. The laser scanning microscope according to claim 1, wherein the controller sets the control signal in a predetermined upper bits or lower bits out of the bit width of the memory.

* * * * *